(12) United States Patent
Andersson et al.

(10) Patent No.: US 6,909,202 B2
(45) Date of Patent: Jun. 21, 2005

(54) DEVICE FOR VEHICLES

(75) Inventors: Björn Andersson, Onsala (SE); Mikael Skorupa, Molnlycke (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/605,378

(22) Filed: Sep. 26, 2003

(65) Prior Publication Data

US 2004/0113493 A1 Jun. 17, 2004

Related U.S. Application Data

(63) Continuation of application No. PCT/SE02/00607, filed on Mar. 26, 2002.

(30) Foreign Application Priority Data

Mar. 26, 2001 (SE) .............................................. 0101045

(51) Int. Cl.$^7$ .............................................. H01H 27/00
(52) U.S. Cl. ...................... 307/10.3; 307/9.1; 307/10.6; 180/287; 340/426
(58) Field of Search ................................ 307/9.1–10.6, 307/10.8; 180/287; 340/426, 825.3–825.36; 439/916; 343/711–716

(56) References Cited

U.S. PATENT DOCUMENTS 4,160,977 A * 7/1979 Davis ......................... 343/713
5,729,057 A 3/1998 Frenzel et al. ............. 307/10.3
5,836,187 A * 11/1998 Janssen et al. ................ 70/252

FOREIGN PATENT DOCUMENTS

| EP | 1071158 A2 | * | 1/2001 | .......... H01Q/09/04 |
| WO | WO 2076795 A1 | * | 10/2002 | .......... B60R/16/02 |

* cited by examiner

Primary Examiner—Robert L. DeBeradinis
(74) Attorney, Agent, or Firm—Novak Druce & Quigg LLP

(57) ABSTRACT

Device for vehicles that includes an electrical cable mat (1), an ignition lock (11, 16), and an antenna (9). The antenna (9) is arranged adjacent to the ignition lock which interacts with a transmit/receive device. The antenna is further arranged to communicate with a key (25) dedicated to the ignition lock (11, 16). The antenna (9) is directly electrically integrated into the cable mat (1) thereby enabling the ignition lock (11, 16) and the antenna (9) to be assembled into one unit by means of coupling means (20–22). An electrical cable bunch for a motor vehicle is also provided intended to interact with an electronic antitheft-system including an antenna for receiving signals from an ignition key dedicated to the vehicle and an electronic unit which processes the signals from the antenna with the antenna being integrated contactlessly in the cable bunch.

5 Claims, 2 Drawing Sheets

DEVICE FOR VEHICLES

CROSS REFERENCE TO RELATED APPLICATIONS

The present application is a continuation patent application of International Application No. PCT/SE02/00607 filed 26 Mar. 2002 which was published in English pursuant to Article 21(2) of the Patent Cooperation Treaty, and which claims priority to Swedish Application No. 0101045-3 filed 26 Mar. 2001. Both applications are expressly incorporated herein by reference in their entireties.

BACKGROUND OF INVENTION

1. Technical Field

The present invention relates to a device for vehicles that includes an electrical cable bunch, a so-called ignition lock, and an antenna located adjacent to the ignition lock that interacts with a transmit/receive device arranged to communicate with a key dedicated to the ignition lock.

2. Background

Essentially all motor vehicles contain a prefabricated cable bunch that contains, more or less, all of the electrical conductors or cables that are necessary in order to tie together all the electrical components of the vehicle into an electrical system. The conductors or cables are thus, when producing the cable bunch, length-wise adapted to the extension they are to have in the vehicle. The conductors/cables are then bunched together with, for example, plastic cable, shrinking tube, or some other kind of plastic casing so that they together form one unit that is referred to as a cable bunch or a cable mat. Associated with each of the various components located in various places around the vehicle that are to be connected to the bunch is a coupling device used to connect the conductors of the cable bunch to the components either via contacts on the components or on cable ends located in the components. In the aggregate, this arrangement composes and is referred to as cabling.

Component(s) that have appeared in modern vehicles are antitheft-systems that comprise (include, but are not limited to) a transmit/receive unit that interacts with one of the ignition keys of the vehicle. For this purpose, the ignition lock of the vehicle is delivered with an antenna assembly associated therewith, and can be equipped with or without an amplifier assembled on the lock at an end where one of the ignition keys of the vehicle is to be entered during use of the vehicle. As in most combustion vehicles, diesel powered vehicles also typically have ignition locks and ignition keys even if they do not control an ignition circuit as such. The antenna located on the lock is connected after the lock and the mat have been assembled together in the vehicle via a contact pair, of which the contact which belongs to the lock can be arranged on a housing which belongs to the antenna and protects it, or on a cable end connected to the antenna or to an amplifier connected to the antenna. A problem in this context is that the currents in the concerned conductors, especially in cases where no amplifier is used, are very small. Additionally, the requirements which are present in vehicle environments give the contacts dimensions which are suitable for vehicles; that is, relatively large dimensions. The combination of large contacts and small currents is unfortunate because poor contact and loose play in the connection can easily arise. As a consequence, so-called fretting can occur.

SUMMARY OF INVENTION

According to the teachings of the present invention, the above-mentioned disadvantages or problem(s) have been solved in a surprisingly advantageous way by letting the antenna be electrically integrated in the cable bunch, directly connected to it, and due to the fact that the ignition lock and the antenna can be connected into one unit using an appropriately configured coupling means. In this way, an electrical cable bunch for a motor vehicle is obtained that is intended to interact with an electronic antitheft-system comprising an antenna for receiving signals from an ignition key dedicated to the vehicle and an electronic unit which processes the signals from the antenna, with the antenna being integrated contactlessly (without contacts) in the cable bunch.

In a further advantageous embodiment of the invention, the antenna is encased in a housing which is provided with an opening, the form of which corresponds to the outer form of the ignition lock across the ignition lock, at that end which is intended for entry of the key. The antenna is attachable outside of the ignition lock. The housing is provided with first members or units adapted for retaining the housing on the locking cylinder during interaction with corresponding second members or units attached to the ignition lock.

By integrating that component in the cable bunch during manufacture, the contact connections that have traditionally introduced problems in the system is eliminated. Instead, an antenna housing is provided with mechanical fastenings that connect the antenna to the ignition lock. In so doing, a simple assembly is obtained in the vehicle so that the antenna is always located well together with the ignition lock, regardless of how it is assembled, for good transmission contact with the key that belongs to the lock. The ignition lock essentially consists of a lock-housing and a lock-cylinder that is rotateable in the housing. Rotation of the lock-cylinder switches a switch connected to the cylinder that in turn is connected to the cable mat and controls the electrical system of the vehicle, usually a processor. It is the lock-housing and the housing of the antenna that are mechanically attached to each other during assembly in the vehicle.

BRIEF DESCRIPTION OF DRAWINGS

The invention will in the following be explained in more detail, and be described in connection to the accompanying drawings in which.

DETAILED DESCRIPTION

Figure 1:
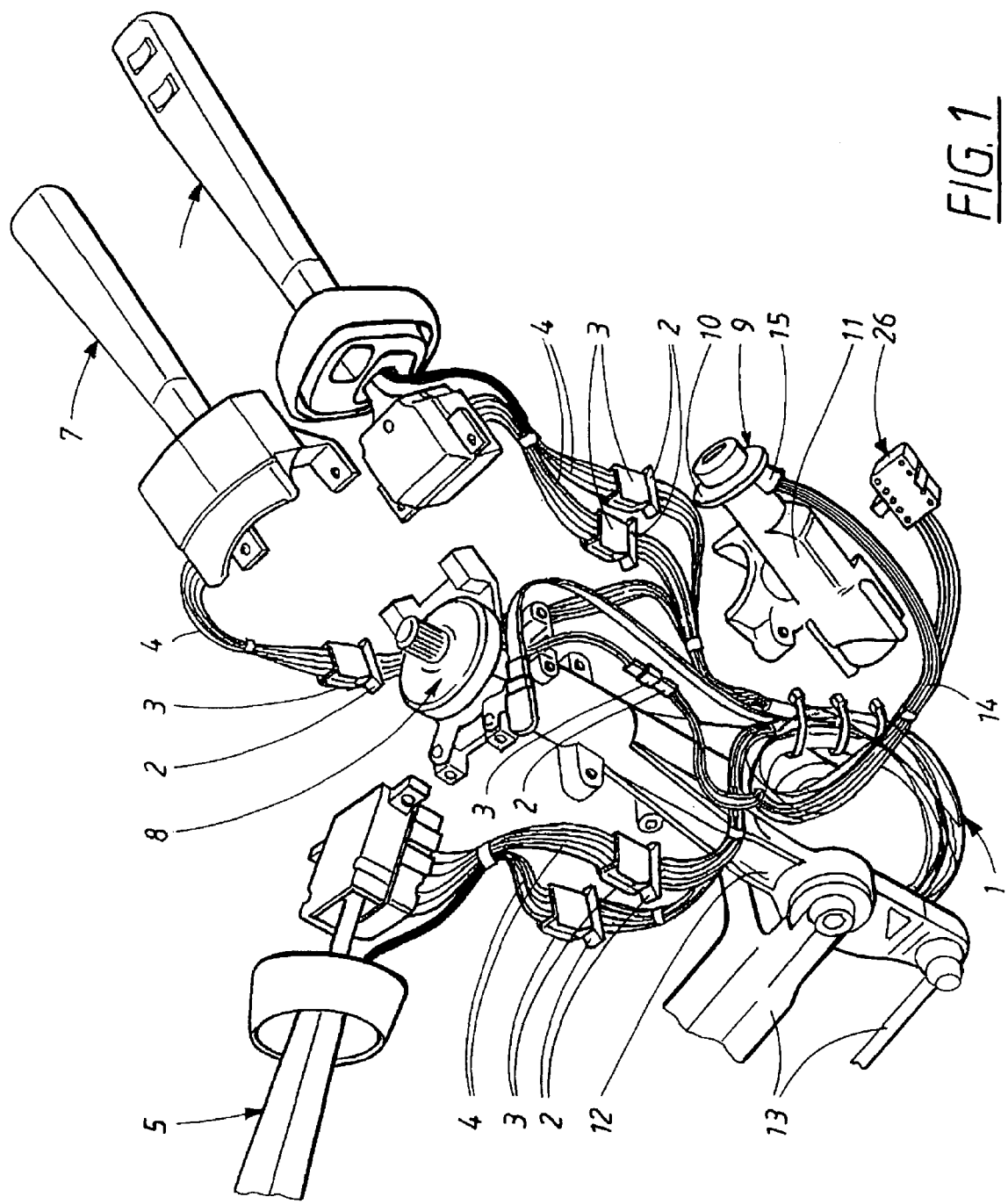
FIG. 1 is a perspective view showing a vehicle cabling that comprises part of a cable bunch belonging to a truck, said part extending up to the wheel controls and including the invention.

FIG. 1 shows an exemplary vehicle cabling suitable for incorporating the arrangement of the present invention. From the illustration, it is apparent that the invention comprises a cable bunch 1 including a number of contacts 2, which, when the cable bunch has been assembled in a vehicle, are normally connected to corresponding contacts 3 which in turn, via short cables 4, are connected to one vehicle component each, for example tail lamp control 5, a cruise control 6, a light switch 7 and a control 8. FIG. 1 also shows other components that are normally included in the cabling of a truck or vehicle, but which are, however, not described in greater detail because they are not relevant to the invention. According to the present invention, the cabling also comprises an antenna 9 that is directly connected in the cable bunch without intermediate contacts or the like. The antenna is integrated already when the cable bunch is manufactured. The antenna is built into an antenna housing 10, preferably molded in plastic, which as depicted in FIG. 1, is in a position assembled to an ignition lock 11 which is intended to be assembled to a wheel shaft housing 12 for a wheel tube (not shown), arranged in adjustable suspension consoles 13. The ignition lock 11 is normally, at that end which is opposite the key end, equipped with a turning switch (not shown) for control of the electrical system of the vehicle by means of the coupling units 26. A cable 14 that is part of the cable bunch 1 and equipped with an appropriate amount of conductors extends into the antenna housing 10 of the antenna 9 via an entry part 15. The cable 14, in its extension in the opposite direction, extends through the cable bunch 1, and at another end at a distance from the key-lock 11 connects either fixedly or via a contact (not shown) together with other cables included in the cable bunch connects to an electronic box arranged in the vehicle (not shown). In this case, there are fewer drawbacks in having contact pairs in the circuit since mechanical stress in the form of vibrations and such things as atmospheric influences are considerably smaller, or can at least be better controlled.

Figure 2:
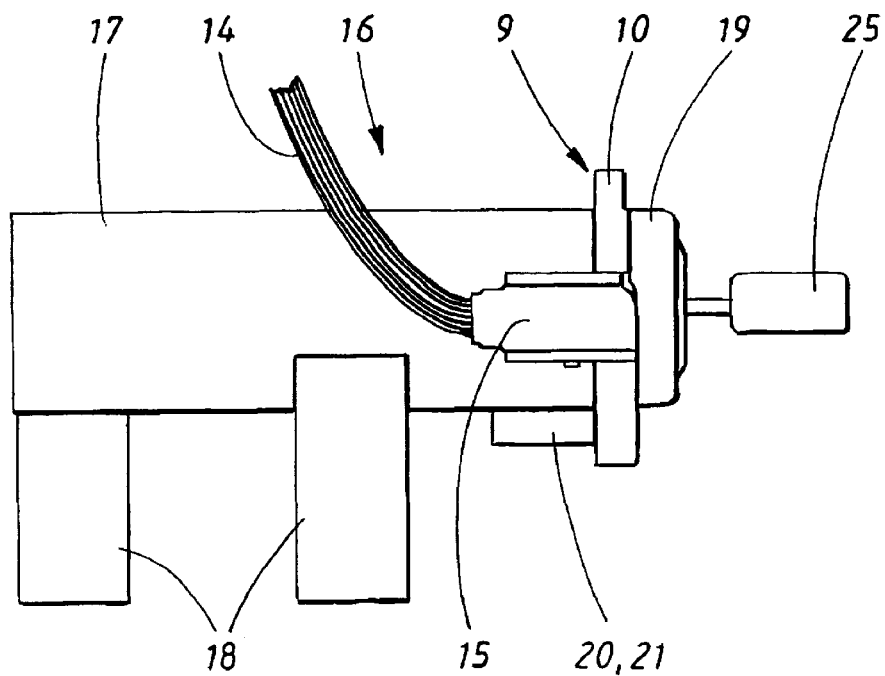
FIG. 2 is a diagrammatical view showing an ignition lock connected to an antenna which is comprised in the invention.

FIG. 2 diagrammatically shows a slightly different version of an ignition lock 16 adapted according to the teachings of the present invention. The ignition lock 16 comprises an essentially cylindrical lock housing 17 at which, in order to enable a good screw tightening at, for example a wheel tube console, there are arranged tubular connection pieces 18 with through (going) holes for fastening bolts (not shown). The antenna housing 10 is arranged at the lock house 17 around its one end 19 where an ignition key is intended to be allowed to be inserted (enter). The connecting cable to the antenna housing is, for the sake of clarity, omitted. The antenna housing 10 is essentially shaped as a ring with a hole in the middle, which hole is shaped so that it, suitably with a gliding fit, fits outside the lock housing 17. The cable 14 which connects to the antenna enters the antenna housing 10 via the entry part 15.

Figure 3:
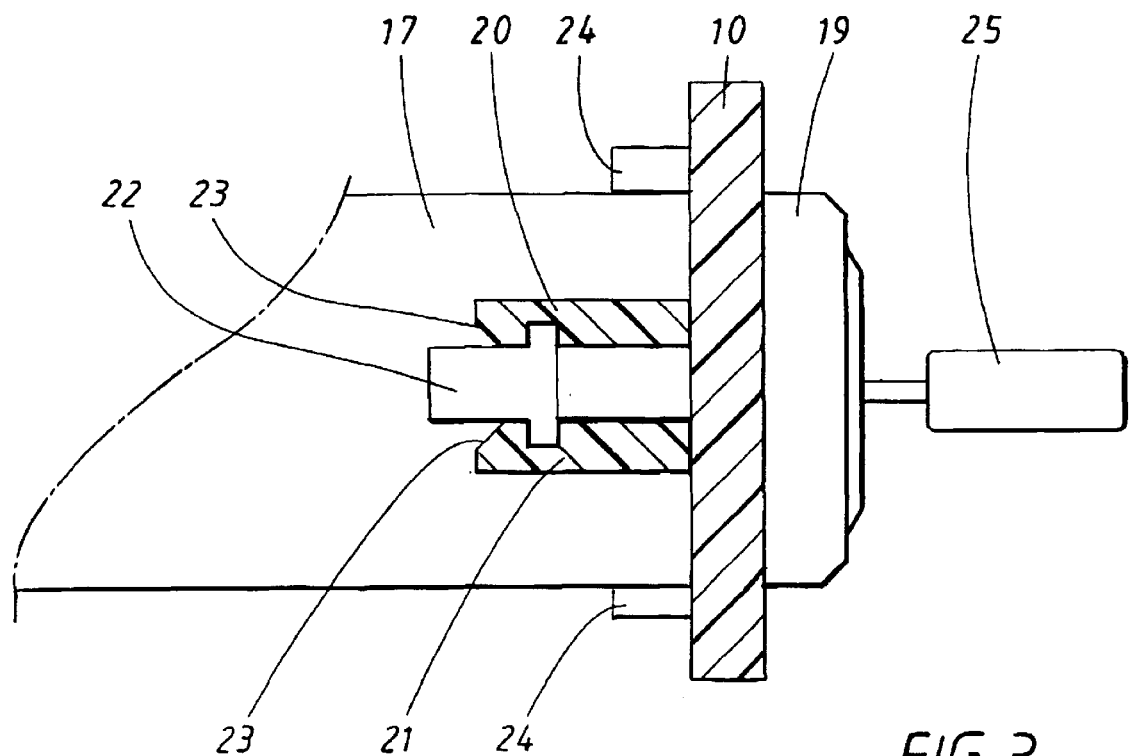
FIG. 3 is a diagrammatical view showing the assembly of the antenna at the ignition lock in greater detail.

In order to retain the antenna housing 10 in its position on the lock housing 17, the antenna housing 10 is provided with a pair of hooks 20, 21 that are slightly enlarged as shown in FIG. 3. The hooks 20, 21 are arranged to interact with a T-shaped protrusion 22 on the lock housing 17, which protrusion is arranged with its "roof" against the lock end 19 so that, when the antenna housing 11 is attached to the lock housing 17 from the lock end 19, the hooks 20, 21 will grip into the "roof" of the T-shaped protrusion 22 and retain the antenna housing in this position. The hooks 20, 21 are, similar to the rest of the antenna housing 10, made of plastic and can thus easily flex out in order to pass and grip around the "roof" of the protrusion 22, and the passage is facilitated by the hooks at their outer end having sloping beveled edges 23.

In order for the antenna housing 10 not to glide too far into the lock housing 17, it is provided with counteracting protrusions 24 which are arranged to receive the antenna housing 10 flush-on when the hooks 20, 21, during assembly, have snapped in behind the "roof" of the T-shaped protrusion 22. In this position, the antenna 9 can interact with a key 25 that has been entered into the ignition lock 16 for communication with the key during verification of the legitimacy of the key.

The invention is not limited to the above-described examples that have been shown in the drawings or described hereinabove, but instead, is defined by the patented claims. For example, the antenna housing can be fastened on the ignition lock by other means. Neither is it of importance how the antenna is designed electrically. It can consist of a simple coil of wire, or it can consist of a coil that has been etched onto a circuit board. The antenna can also be designed for attachment to the ignition lock with good communication with a key that has been entered into the lock without being directly attached to the ignition lock, although such an embodiment might necessitate other steps than an adaptation of the lock housing.

What is claimed is:

1. An electrical connection for a vehicle comprising:

a cable bunch containing a plurality of electrical conductors and cables for tying together electrical components of the vehicle into an electrical system thereof;

an antenna, the antenna configured to be positioned adjacent to an ignition lock and to interact with a transmit/receive device, the antenna being configured to communicate with a dedicated key to the ignition lock; and the antenna being contactlessly and directly integrated into the cable bunch and thereby interconnectable to the ignition lock via an interacting coupling means.

2. The electrical connection as recited in claim 1, further comprising:

an antenna housing provided with an opening shaped to conformance-fit with an outer form of an end of the ignition lock opposite a key-access end thereof; and the antenna housing being attachable outside of the ignition lock, and the antenna housing being further provided with first member configured for retaining the housing on the ignition lock during interaction with a corresponding second member arranged on the ignition lock.

3. The electrical connector for a motor vehicle as recited in claim 1, wherein said electrical conductors comprise electrical cables.

4. An electrical connector for a motor vehicle, comprising:

a plurality of electrical conductors bundled together into a connective bunch and adapted to electrically connect electrical components of the vehicle into an electrical system of the vehicle; and the connective bunch configured to interact with an electronic anti-theft system that includes an antenna for receiving signals from an ignition key dedicated to the vehicle and an electronic unit that processes signals from the antenna, the antenna being contactlessly integrated into the connective bunch.

5. The electrical connector for a motor vehicle as recited in claim 4, wherein said electrical conductors comprise electrical cables.

* * * * *